United States Patent
Snagel et al.

(10) Patent No.: US 6,851,888 B2
(45) Date of Patent: Feb. 8, 2005

(54) PAVEMENT MARKER

(75) Inventors: Paul Snagel, Chicago, IL (US); David Langlands, Mount Prospect, IL (US); Swanand Sardesai, Forest Park, IL (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 10/458,533

(22) Filed: Jun. 9, 2003

(65) Prior Publication Data

US 2004/0247387 A1 Dec. 9, 2004

(51) Int. Cl.[7] ............................................... E01F 9/06
(52) U.S. Cl. ........................... 404/13; 404/15; 404/16
(58) Field of Search ........................... 404/13, 15, 16, 404/34; D10/13; D25/140; 52/390

(56) References Cited

U.S. PATENT DOCUMENTS

| | | | | | |
|---|---|---|---|---|---|
| 3,179,009 A | * | 4/1965 | Sheffield et al. | ............... | 404/16 |
| 4,694,627 A | * | 9/1987 | Omholt | ........................ | 52/390 |
| 5,667,334 A | * | 9/1997 | Boyce | ............................ | 404/9 |
| 6,126,360 A | * | 10/2000 | May et al. | .................... | 404/14 |
| 6,267,530 B1 | * | 7/2001 | Attar | ............................ | 404/16 |
| 6,334,734 B1 | * | 1/2002 | Attar | ............................ | 404/16 |
| 6,579,036 B2 | * | 6/2003 | Attar | ............................ | 404/16 |

* cited by examiner

Primary Examiner—Gary S. Hartmann
(74) Attorney, Agent, or Firm—Gerald E. Heepos; Anthony J. Casella

(57) ABSTRACT

A pavement marker has a base having at least one opening formed therein. A groove is formed in the base substantially adjacent the opening. The pavement marker further includes a cover for covering the opening in the base. The cover is formed with at least one energy directing rib configured for nesting with the groove in the base. The cover is ultrasonically welded to the base so that the energy directing rib melts and integrally fuses to portions of the base adjacent the groove.

10 Claims, 7 Drawing Sheets

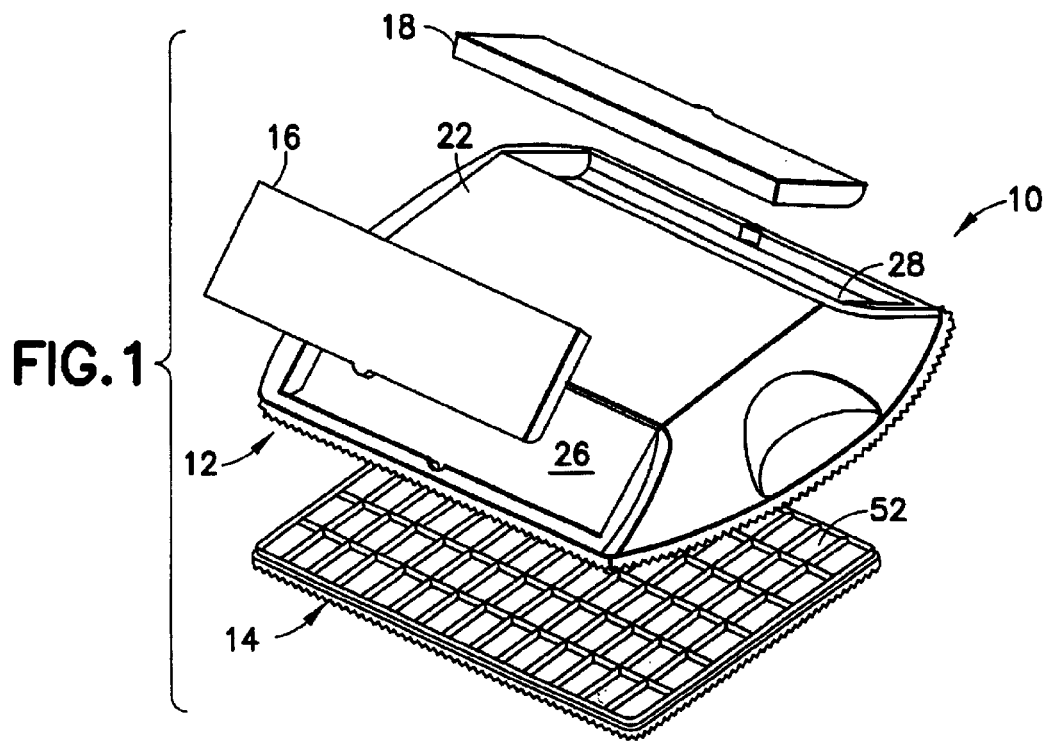
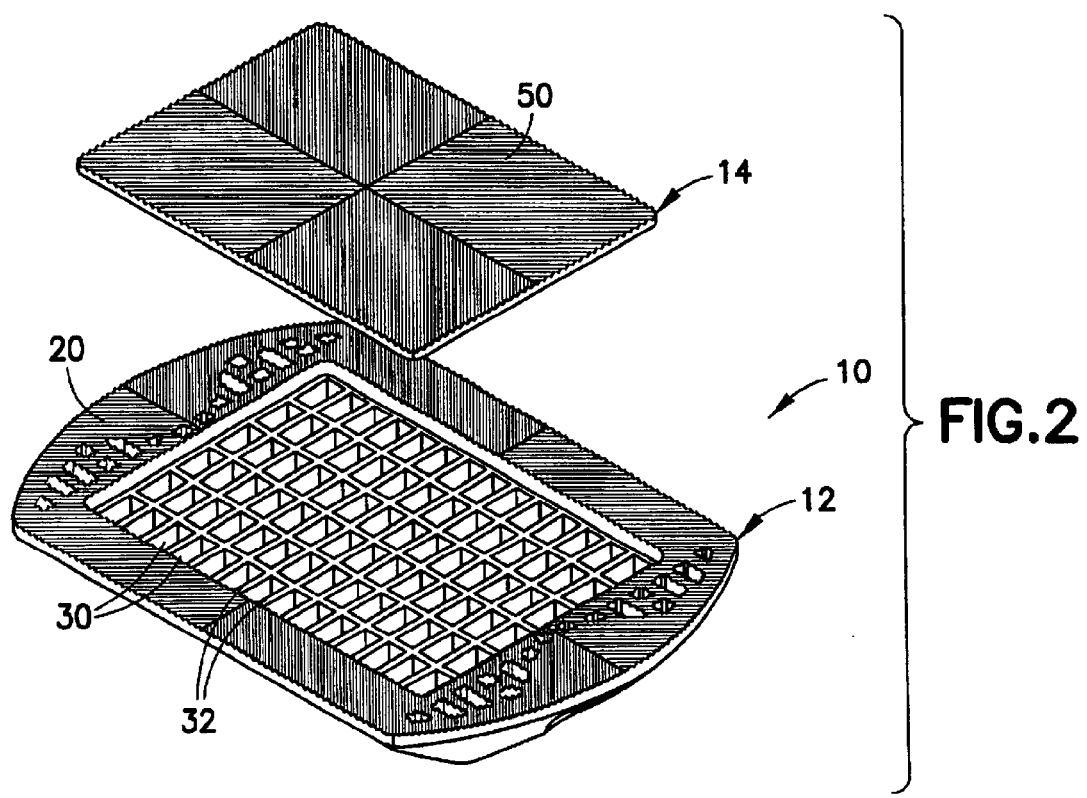

PAVEMENT MARKER

BACKGROUND OF THE INVENTION

1. Field of the Invention

The invention relates to a pavement marker that reflects and/or transmits light for identifying selected regions of a driving surface.

2. Description of the Related Art

Pavement markers are secured on or in a pavement surface to help direct drivers along preferred travel lanes. A typical pavement marker includes a plurality of separate components selected to perform specified functions. For example, a typical pavement marker may include a base and at least one light transmissive or retroreflective panel mounted to the base to produce optical signals that will be visually apparent to a driver approaching the pavement marker. The base of a surface-mounted pavement marker typically may be molded from a thermoplastic material and may include a bottom surface configured for affixation on the surface of the pavement. The base may further include a top area configured for receiving the light transmissive and/or retroreflective panel.

Injection molded plastic products that are thick require a long time to cure and create the potential for sink marks or other dimensional irregularities. As a result, most injection molded products are formed with an array of coring holes separated by a unitary matrix of thermoplastic webs. The webs are designed to be of substantially uniform thickness. The thickness and arrangement of the webs is selected to ensure adequate strength for the thermoplastic product and to achieve substantially uniform curing of the thermoplastic material. The base of a surface-mounted pavement marker typically is designed with coring holes for the above-described reasons.

Coring holes that extend in a side-to-side or front-to-rear direction on the base of a pavement marker could affect the strength of the base and could lead to failure in response to impact by vehicular tires. Coring holes that extend in a top to bottom direction are much less likely to create stress related failures. However, coring holes that extend downwardly into the top surface of the base require a separate cover to prevent accumulation of liquid or debris. The coring holes can be covered by the lens or retroreflective panel of the pavement marker.

The assignee of the subject invention has determined that a large lower surface area helps to retain the pavement marker in a fixed position on the pavement. Coring holes that extend into the bottom surface of a pavement marker necessarily reduce the surface area, and hence can adversely affect the retention of the pavement marker on the pavement. Copending U.S. patent application Ser. No. 10/442,336 discloses a pavement marker with a bottom cover that closes the coring holes and increases the bottom surface area.

The above-described components of a pavement marker must be securely affixed to one another. Ultrasonic welding offers many manufacturing advantages and efficiencies for such affixation. For example, ultrasonic welding avoids difficulties of selecting an appropriate adhesive that is compatible with both of the materials being adhered. Additionally, ultrasonic welding avoids the additional manufacturing steps of applying adhesive, as well as environmental, health and safety concerns relating to the use of some adhesives.

The typical ultrasonic welding apparatus employs an anvil for supporting one of the objects that are to be welded and a horn for disposition against the other of the objects to be welded. The horn applies high frequency sound energy near a selected weld location. The sound energy excites the molecules in the plastic and causes the plastic to melt near the application of the sound energy. The plastic will harden shortly after the ultrasonic energy has been stopped and the two materials will weld together.

Ultrasonic energy may be used in the above-described pavement marker by applying the ultrasonic energy to locations on the panel or cover opposed to the webs that separate the coring holes. The ultrasonic energy is intended to melt or soften the thermoplastic material of the panel or cover so that the melted thermoplastic of the panel or cover fuses with the opposed thermoplastic material of the web.

Molten material produced by ultrasonic welding tends to spread transversely away from the center of the application of ultrasonic energy. Thus, the molten plastic will flow away from the webs that support the panel or cover on the pavement marker. These wide pools of molten thermoplastic material then harden. However, a substantial portion of the hardened pool of plastic will contribute little or nothing to the secure attachment of the panel or cover to the base. Consequently, the energy expended and the time allotted for ultrasonic welding is not always commensurate with the benefit achieved. Additionally, the strength of some ultrasonic welds may not be adequate to withstand stresses imposed by vehicular tires.

Some pavement markers include a fluorescent top panel designed to produce an edge glow. More particularly, fluoresced photons are emitted within the marker top and strike the bottom and/or top surfaces of the top panel. The fluoresced photons that strike these top and bottom surfaces at appropriate angles will be reflected internally and redirected within the panel. A significant portion of these internally reflected photons will be emitted from the edge of the panel to produce an edge glow that will be visually apparent to a driver. Pavement markers desirably are designed to maximize the edge glow. Any geometry of the panel that deviates from a smooth flat surface will allow photons to escape, and hence will decrease the effect of the edge glow. The above-described ultrasonic welding pattern effectively produces a wide frozen puddle of plastic, and hence creates a substantial deviation from the initially planar surface of the plastic. Accordingly, ultrasonic welding can reduce the edge glow effect.

SUMMARY OF THE INVENTION

The subject invention relates to a pavement marker having at least first and second components that are ultrasonically welded to one another. The first component is formed with at least one weld channelizing groove and the second component is formed with at least one energy directing rib that nests with the groove when the first and second components are assembled properly. The first and second components are welded ultrasonically to one another at the interface of the energy directing rib and the weld channelizing groove. As a result, an integral matrix of weldment exists at the interfitting surfaces defined by the rib and the mating side and base surfaces of the groove. Accordingly, a large, predictable and more effective attachment area is defined for the ultrasonic weldment with a corresponding increased bond potential and a stronger bond.

The first component preferably includes a plurality of weld channelizing grooves, and the second component preferably includes a corresponding plurality of energy directing ribs. The ultrasonic welding preferably is applied at a plurality of the interfitting ribs and grooves.

The weld channelizing grooves in the first component may define recessed areas in a surface of the first component. Alternatively, the weld channelizing groove in the first component may be defined between a pair of ribs on the first component. Thus, the rib of the second component is nested in the groove between the pair of ribs on the first component.

The energy directing rib on the second component may initially be pointed to form a well defined region for receiving the ultrasonic energy that will achieve the welded connection between the first and second components. A groove on the first component may define a rectangular cross-section. The cross-sectional areas of the rib and the groove may approximately equal one another so that the material of the rib will substantially fill the groove after ultrasonic welding for maximizing bonding potential.

The first and second components preferably are formed from a plastic material. More particularly, the first component may be injection molded from a plastic material and may be formed with a plurality of coring holes to facilitate molding and curing of the plastic. The coring holes preferably are separated from one another by webs of plastic, and the grooves may be formed in the webs of the first component.

The first component of the pavement marker may define a unitary base and may be configured for surface mounting on an area of pavement. The second component may be a bottom cover configured for covering coring holes in a bottom surface of the base. Additionally or alternatively, the second component may be an optical component mounted to an upper surface of the base and formed from a material for directing light toward an oncoming vehicle.

The subject invention also is directed to a method for manufacturing a pavement marker. The method comprises molding a first component of the pavement marker to include at least one weld channelizing groove. The method further includes forming at least a second component of the pavement marker to include at least one energy directing rib. The method proceeds by assembling the first and second components so that the rib of the second component fits in the groove of the first component. The method then applies ultrasonic energy to regions substantially registered with the interfitting rib and groove to melt material of at least the second component into welded engagement with regions of the first component defined by the groove.

The method step of forming the first component may comprise forming the first component from plastic, and may specifically comprise injection molding the plastic material. The molding preferably is carried out to form a plurality of grooves for nesting with a corresponding plurality of energy directing ribs in the second component. The molding step may be carried out to form a plurality of coring holes in the first component, and at least one of the grooves may be defined on a web that separates a plurality of the coring holes.

The method step of forming the energy directing rib may comprise forming the rib with a pointed edge, and the method step of forming the groove may comprise forming a groove of substantially rectangular cross-section. The formation of the rib and the groove preferably are carried out so that the groove defines a cross-sectional area at least equal to a cross-sectional area defined by the rib. Thus, the ultrasonic welding step will cause the rib to melt and substantially fill the groove, with surface-to-surface bonding between the rib and the inwardly facing surfaces of the groove. However, the ultrasonic welding step will not create an excess of weldment that will impede proper mounting of the first and second components to one another. The ultrasonic welding may be carried out to achieve a hermetic seal.

BRIEF DESCRIPTION OF THE DRAWINGS

FIG. 1 is an exploded perspective view of a pavement marker in accordance with a first embodiment of the subject invention as viewed from the top of the pavement marker.

FIG. 2 is an exploded perspective view of the pavement marker of FIG. 1 as viewed from the bottom of the pavement marker.

DETAILED DESCRIPTION OF THE PREFERRED EMBODIMENTS

Figure 3:
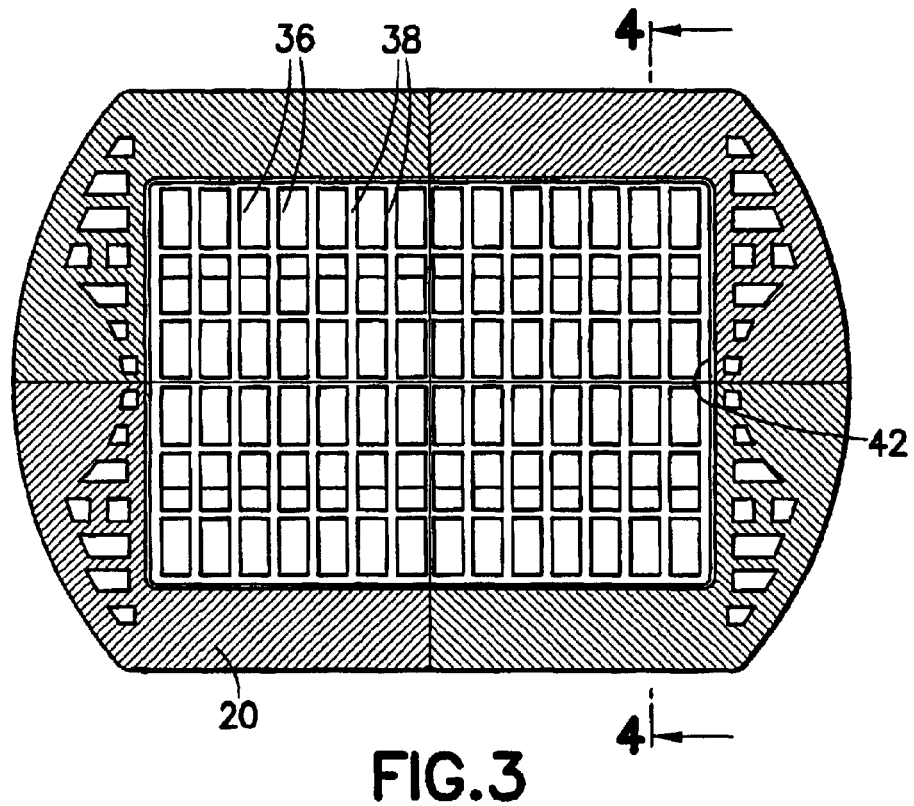
FIG. 3 is a bottom plan view of the base of the pavement marker.
Figure 4:
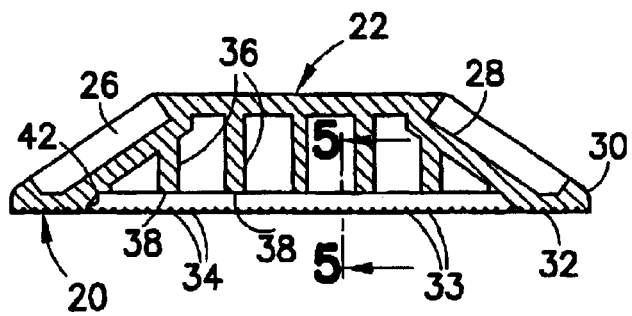
FIG. 4 is a cross-sectional view taken along line 44 in FIG. 3.
Figure 5:
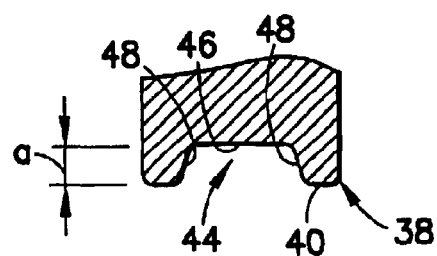
FIG. 5 is a cross-sectional view taken along line 5—5 in FIG. 4.

A pavement marker in accordance with the subject invention is identified generally by the numeral 10 in FIGS. 1–12. The pavement marker 10 includes a base 12, a bottom cover 14 and front and rear lenses 16 and 18. The base 12 is molded unitarily from a thermoplastic material and includes a bottom 20, as shown most clearly in FIG. 2 and an opposed top 22 as shown most clearly in FIG. 1. The top 22 is formed with front and rear lens recesses 26 and 28 for receiving the front and rear lenses 16 and 18 respectively. The lenses 16 and 18 may be secured in the respective lens recesses 26 and 28 by adhesive or mechanical attachment means. Other aspects of the shape and function of the top 22 of the base 12 and the lenses 16 and 18 are not critical to the first embodiment of the invention and are not described further herein. However, the construction and function of the top of the pavement marker is more relevant to the second embodiment of the invention and is described in greater detail below in the context of the second embodiment.

The bottom 20 of the base 12 includes an outer periphery 30 and a peripheral region 32 extends inwardly from the outer periphery 30. The peripheral region 32 is characterized by at least one array of grooves 33 spaced from one another by V-shaped ridges 34. The ridges 34 define peaks that lie substantially in a common plane. The array of grooves 33 and ridges 34 across the peripheral region 32 increases the surface area of the bottom 20 and hence improves the ability of bitumen or other adhesive to hold the pavement marker 10 in a substantially fixed position on the surface of the pavement.

The bottom 20 of the base 12 further includes a plurality of coring holes 36 spaced inwardly from the peripheral region 32 and separated from one another by webs 38. The coring holes 36 are provided to achieve a substantially uniform thickness of plastic material throughout the base 12 to ensure substantially uniform dimensions of the plastic after curing. Hence, the webs 38 are of substantially equal thicknesses. The webs 38 have lower ends 40 that define a substantially common plane parallel to the plane defined by the ridges 34 on the peripheral region 30. However, the plane defined by the lower ends 40 of the webs 38 is offset upwardly relative to the plane defined by the ridges 34. Thus, the bottom 20 defines a recess 42 that encompasses the coring holes 36 and the webs 38. The lower end 40 of each web 38 is characterized by a central groove 44. Each groove 44 is of generally rectangular cross-section and includes a top surface 46 and opposed side surfaces 48. The side surfaces flare outwardly and away from one another at further distances from the top surface to facilitate molding. Each groove preferably has a depth "a" of 0.01–0.03 inch, and most preferably about 0.018 inch. Groves 44 also are formed to extend around the perimeter of the recess 42.

Figure 6:
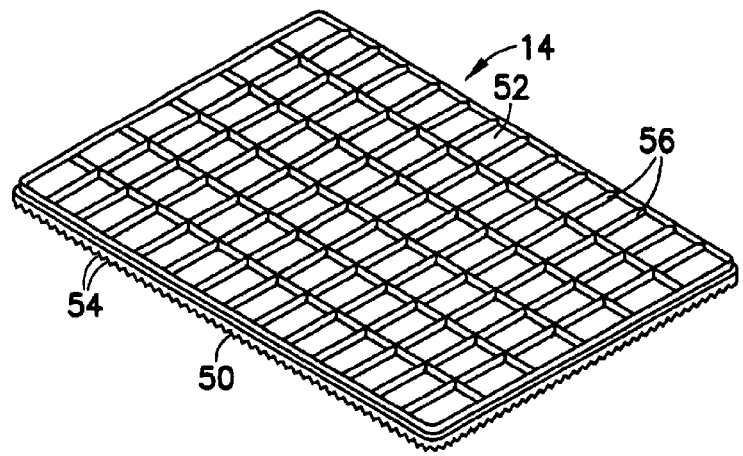
FIG. 6 is a perspective view of the bottom cover as viewed from the top.
Figure 7:
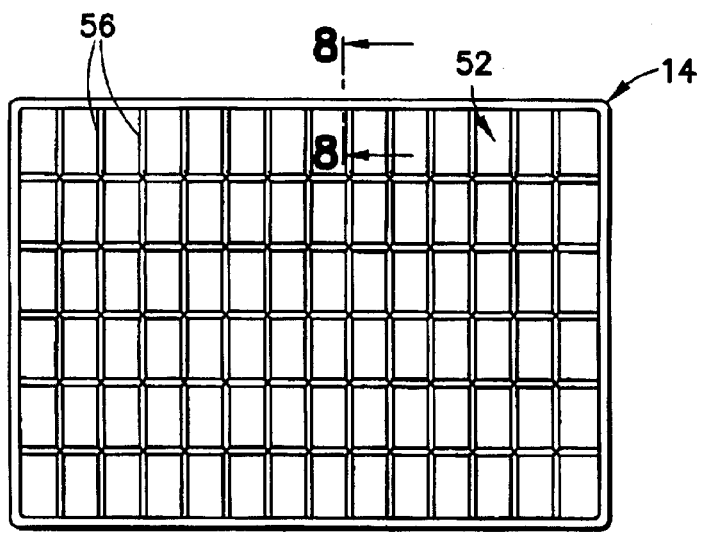
FIG. 7 is a top plan view of the bottom cover.
Figure 8:
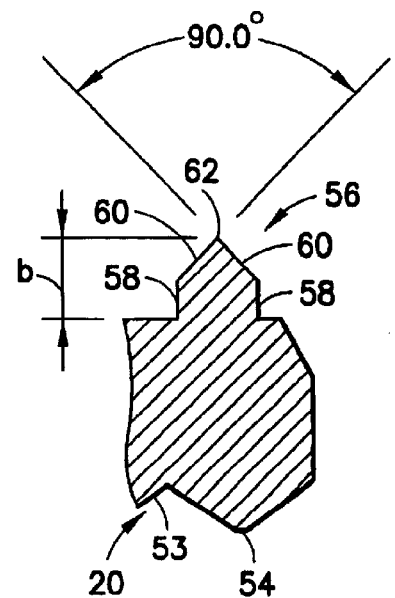
FIG. 8 is a cross-sectional view taken along line 8—8 in FIG. 7.
Figure 9:
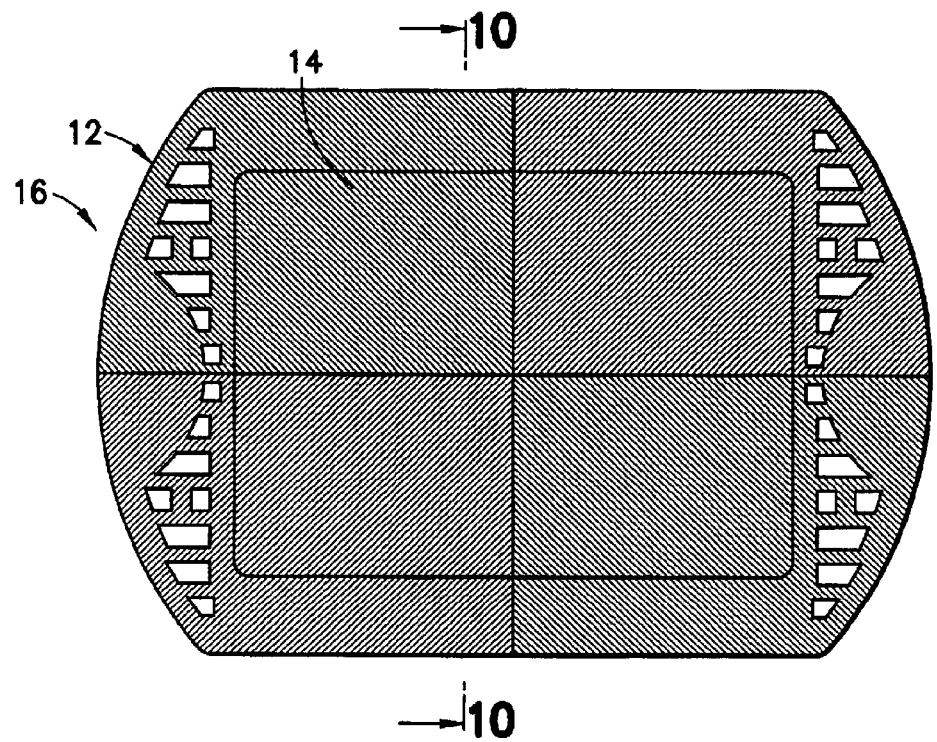
FIG. 9 is a bottom plan view of the assembled pavement marker.
Figure 10:
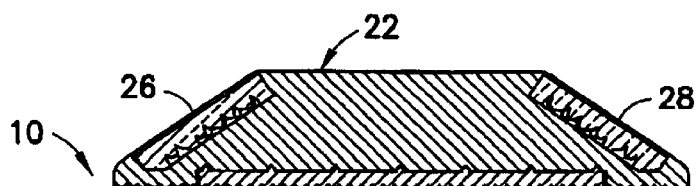
FIG. 10 is a cross-sectional view taken along line 10—10 in FIG. 9.

The bottom cover 14 is a substantially planar rectangle with an outer periphery substantially corresponding to the shape of the recess 42 in the bottom 20 of the base 12. More particularly, the bottom cover 14 includes a bottom surface 50, as shown in FIG. 2, and an opposed top surface 52, as shown in FIGS. 1, 6 and 7. The bottom surface 50 is formed with an array of grooves 53 separated from one another by ridges 54. The peaks of the ridges 54 define a substantially common plane. The combination of grooves 53 and ridges 54 function to substantially increase the surface area of the bottom surface 50 of the cover 14 to enhance the retention of the bottom cover 14 by bitumen or other adhesive used for holding the pavement marker 10 on a pavement surface.

The top surface 52 of the bottom cover 14 is characterized by an array of energy directing ribs 56 that are disposed to register with the webs 38 on the bottom 20 of the base 12. Each rib 56 includes a pair of substantially parallel side surfaces 58 and a pair of converging surfaces 60 that meet along a substantially linear edge 62. The spacing between the side edges 58 of each energy directing rib 56 is less than the spacing between the side edges 48 of each groove 44. However, the height "b" of each rib 56 is approximately 0.3–0.4 inch and preferably about 0.35 inch. More specifically, the height "b" of each rib 56 exceeds the depth of the corresponding grooves 44. The tapered surfaces 60 and the edge 62 between each pair of tapered surfaces 60 define energy directors as explained herein.

Figure 11:
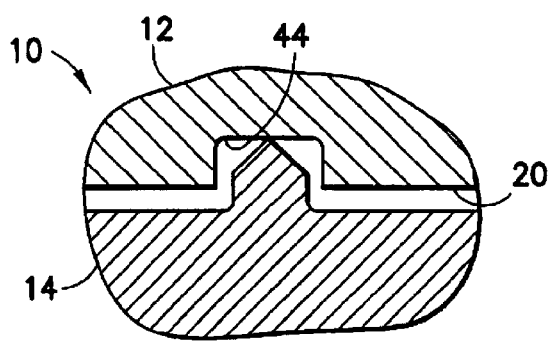
FIG. 11 is a cross-sectional view showing a nested rib and groove before welding.
Figure 12:
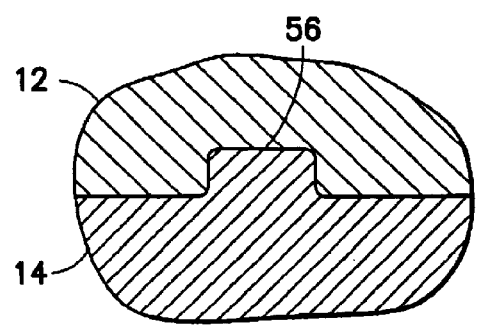
FIG. 12 is a cross-sectional view showing the rib and groove after welding.

The pavement marker 10 is assembled by affixing the lenses 16 and 18 in the lens recesses 26 and 28 respectively by using known technology, such as adhesives or mechanical affixation. The top surface 52 of the bottom cover 14 then is telescoped upwardly into the recess 42 in the bottom 20 of the base 12, as shown in FIGS. 9–12. As a result, the ribs 56 on the top surface 52 nest with the grooves 44 formed in the bottom 20 of the base 12, as shown in FIG. 11. The assembled pavement marker 10 then is presented to an ultrasonic welding apparatus. More particularly, the ultrasonic welding apparatus includes a horn configured to align substantially with the energy directing ribs 56. Pressure and ultrasonic energy then are applied by the horn so that the energy director defined by the tapered surfaces 60 and the edge 62 on each rib 56 melt and fuse unitarily or integrally with the plastic material surrounding the corresponding grooves 44, as shown in FIG. 12. The side surfaces 48 of each groove 44 function to chanelize and contain the molten plastic of the corresponding rib 56. As a result, there is less spreading of the molten plastic material and more effective retention of the bottom cover 14 in the recess 42 of the base 14.

An alternate embodiment of the subject pavement marker is identified generally by the numeral 70 in FIGS. 14–20. The pavement marker 70 includes a base 72, front and rear lenses 74 and 76 and a top cover 78.

The base 72 is molded unitarily from a rigid plastic material and includes opposite front and rear edges 80 and 82 and opposed first and second side edges 84 and 86. The base 72 further includes a bottom 88 characterized by a plurality of arrays of grooves 90 and V-shaped ridges 92. The grooves 90 and ridges 92 function to increase the surface area across the bottom 88 of the base 72. Not all of the grooves 90 and ridges 92 are parallel to one another. In the illustrated embodiment, the bottom 88 is divided into four quadrants. The grooves 90 and ridges 92 in each quadrant are parallel to one another, but are substantially perpendicular to the grooves 90 and ridges 92 in the quadrant adjacent thereto. Thus, the pavement marker 70 is unlikely to slip transversely in the bitumen or other adhesive due to forces exerted by the impact of vehicle tires on the pavement marker 70.

The bottom 88 of the base 72 has a plurality of coring holes 94, but a much smaller number of coring holes than in the bottom 20 of the base 12 of the first embodiment. Additionally, there is no recess in the bottom 88 of the base 72. Hence, the pavement marker 70 does not require the bottom cover described and illustrated above with respect to the first embodiment.

The base 72 further includes a top area that differs substantially from the top of the base 12 illustrated with respect to the first embodiment. More particularly, the base 72 includes a front surface 100 that slopes upward and inwardly from the front edge 82 and a rear surface 102 that slopes upwardly and rearwardly from the rear edge 82. First and second side surfaces 104 and 106 curve upwardly and forwardly from the respective first and second side edges 84 and 86 and extend between the front and rear surfaces 100 and 102. The side surfaces 104 and 106 are characterized by concave finger grips 108 and 110 respectively to facilitate manipulation and placement of the pavement marker 70.

Figure 13:
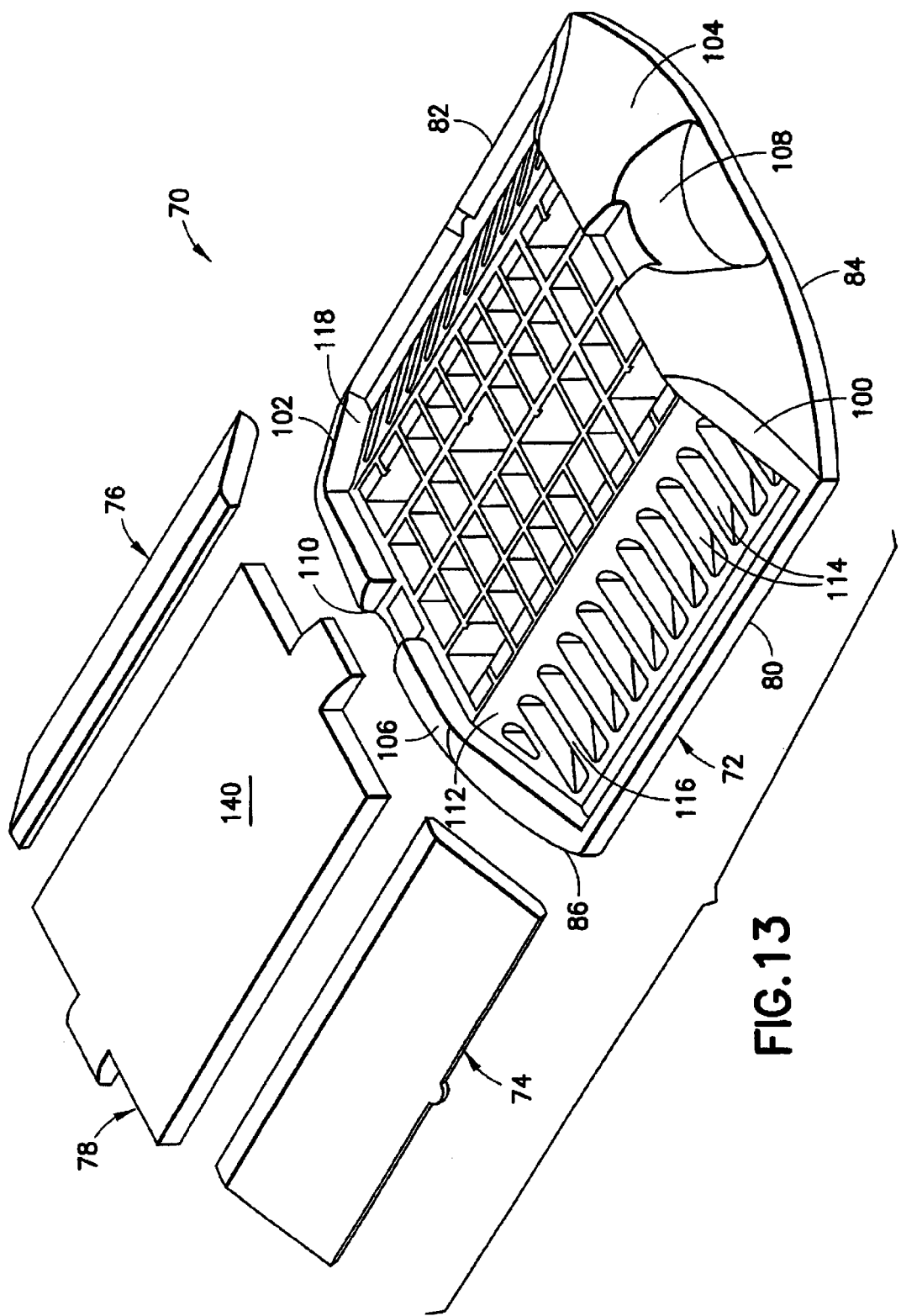
FIG. 13 is an exploded perspective view of an alternate pavement marker in accordance with the subject invention.
Figure 14:
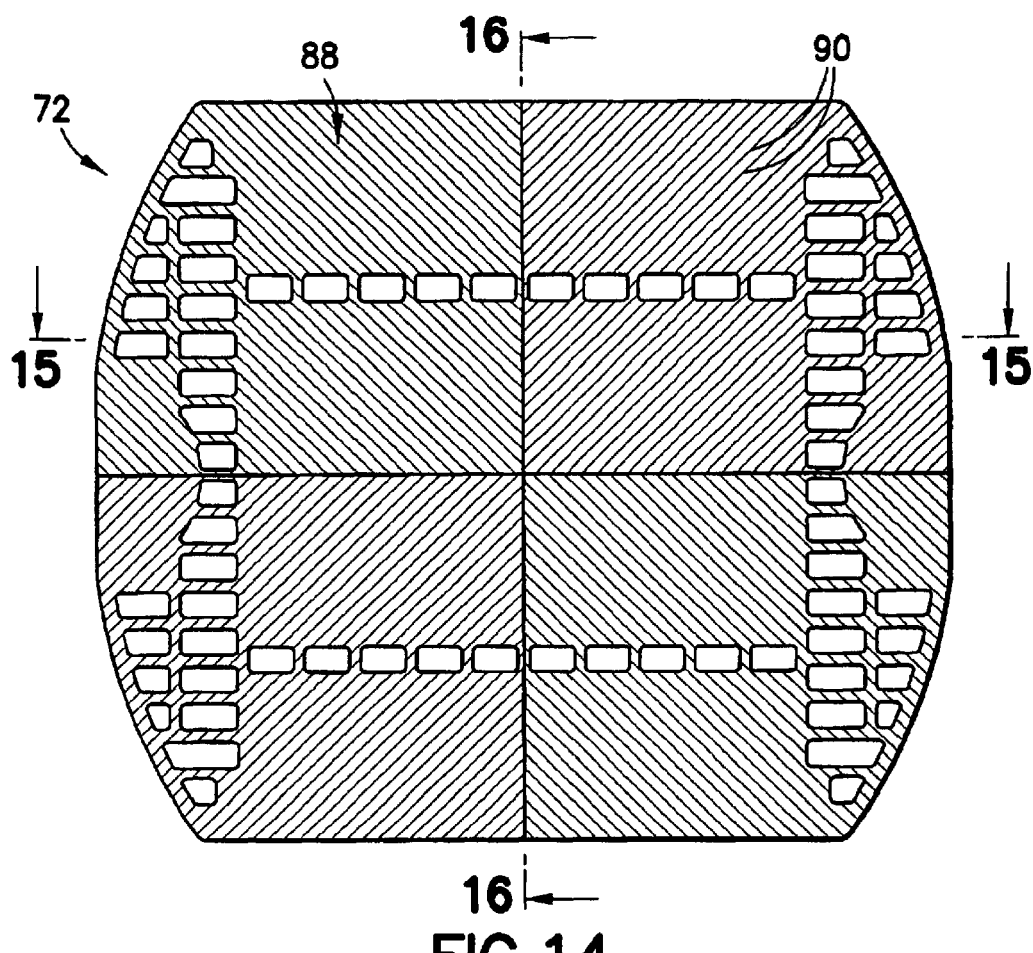
FIG. 14 is a bottom plan view of the pavement marker of FIG. 13.
Figure 16:
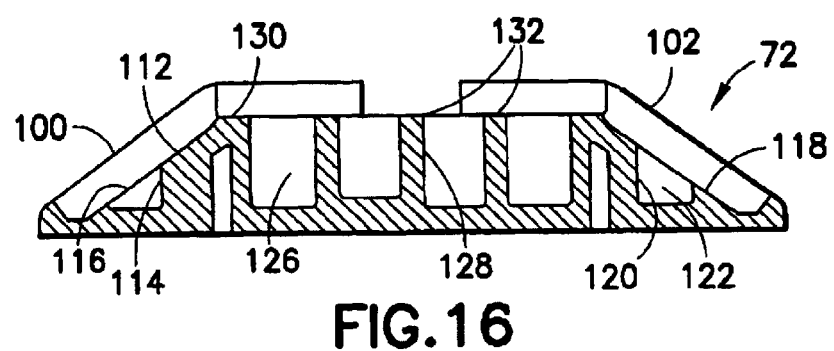
FIG. 16 is a cross-sectional view taken along line 16—16 in FIG. 14.

The front surface 100 is characterized by a front lens recess 112 with a plurality of downwardly extending front coring holes 114 separated from one another by a plurality of front webs 116, as shown in FIGS. 13 and 16. The front webs 116 have upper edges that lie substantially in a common plane. The front lens recess 112 is dimensioned and configured for closely receiving the front lens 74 so that portions of the front lens 74 facing outwardly are substantially flush with portions of the front surface 100 adjacent the front lens recess 112. The front lens 74 may be affixed in the front lens recess 112 by adhesive welding, or mechanical fasteners. In view of this attachment, the coring holes 114 in the front lens recess 112 are covered by the front lens 74.

The rear surface 102 is formed to include a rear lens recess 118 with a plurality of rear coring holes 120 separated from one another by a plurality of rear webs 122, as shown in FIGS. 13 and 16. The rear webs 122 include upper ends 122 that lie in a common plane. The rear lens recess is dimensioned to receive the rear lens 76 so that the upper and outer face of the rear lens 76 is substantially flush with portions of the rear surface 102 adjacent the rear lens recess 118. The rear lens 76 may be affixed in the rear lens recess 118 in the same manner as the affixation of the front lens 74 in the front lens recess 112.

Figure 15:
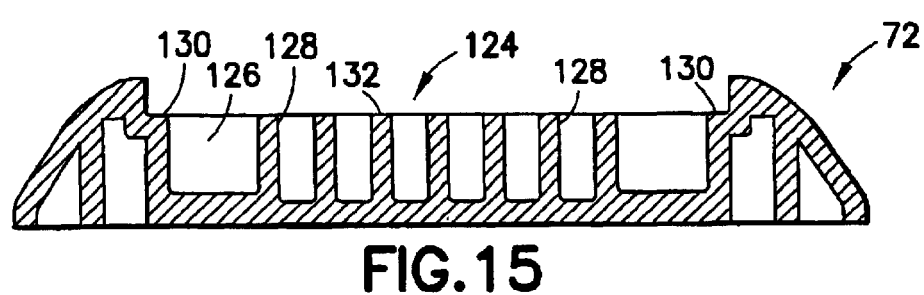
FIG. 15 is a cross-sectional view taken along line 15—15 in FIG. 14.

The base 72 further includes a top cover recess 124 that extends in a front-to-rear direction between the front lens recess 112 and the rear lens recess 118, as shown in FIGS. 13 and 15. Additionally, the top cover recess 124 extends in a side-to-side direction between the first and second side surfaces 104 and 106. Areas of the base 72 corresponding to the top cover recess 124 include a plurality of downwardly extending coring holes 126 separated from one another by a unitary array of webs 128. Additionally, the coring holes 128 are spaced inwardly by peripheral ledges 130 that extend around the entire perimeter of the top cover recess 124. The webs 128 and the peripheral ledges 130 have top ends 132 that lie substantially in a common plane parallel to the bottom 88 of the base 72. The cover recess 124 is configured to receive the top cover 78 as explained herein.

The webs 128 each include an upwardly facing web groove 134. Additionally, the peripheral ledges 130 include a continuous peripheral groove 136 extending entirely around the top cover recess 124. The grooves 134 and 136 are of substantially identical cross-sectional shape and are substantially identical to the cross-sectional shape of the grooves 44 in the recess 32 of the base 12 described with respect to the first embodiment. More particularly, each groove 134 and 136 is of substantially flared rectangular cross-section with a bottom surface and side surfaces that diverge slightly away from one another. Each groove 134 and 136 is of substantially the same depth as the grooves 44 described with respect to the first embodiment.

Figure 17:
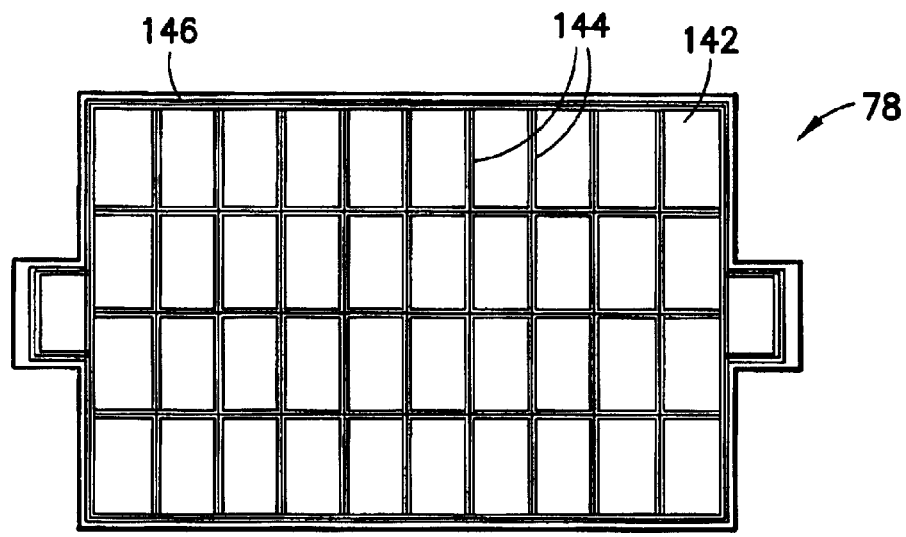
FIG. 17 is a bottom plan view of the top cover.
Figure 18:
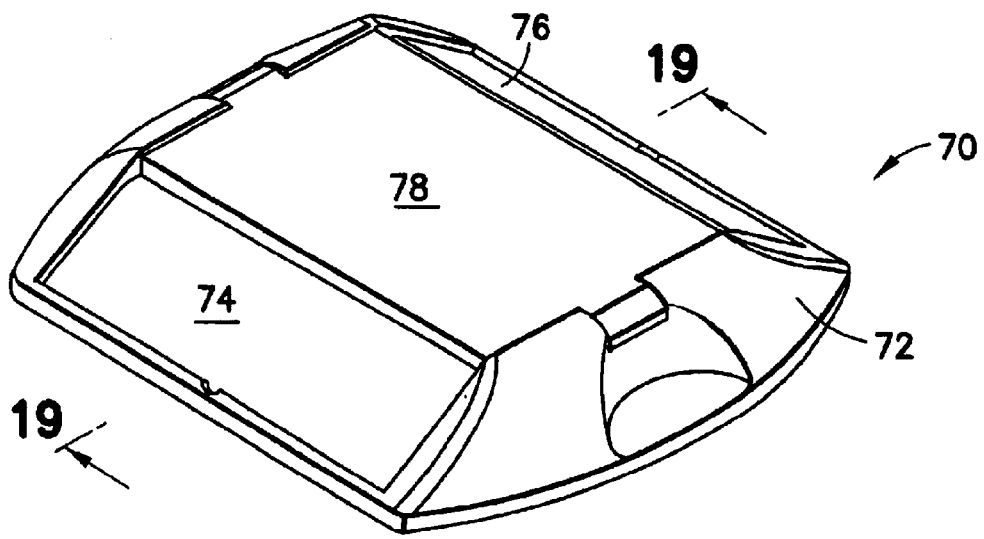
FIG. 18 is a perspective view of the assembled pavement marker.
Figure 19:
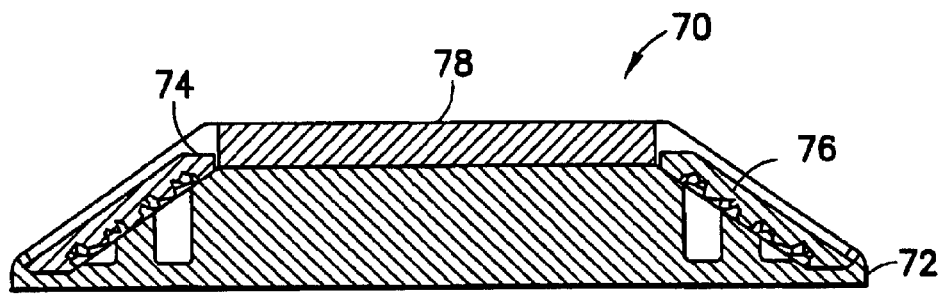
FIG. 19 is a cross-sectional view taken along line 19—19 in FIG. 18.

The top cover 78 is formed unitarily from a fluorescent plastic material, such as a polycarbonate sold by General Electric under the trademark LEXAN®. The top cover 78 includes a substantially planar top surface 140, as shown in FIG. 13 and an opposed bottom surface 142, as shown in FIG. 17. The bottom surface 142 is characterized by an array of downwardly extending energy directing ribs 144 dimensioned and configured for nesting with the grooves 134 in the webs 128 formed in the base 72. Additionally, the bottom surface 142 of the top cover 78 includes a continuous peripheral energy directing rib 146 extending entirely around the periphery of the bottom surface 142 of the top cover 78 for nesting with the peripheral groove 136. The energy directing ribs 144 and 146 have cross-sectional shapes and sizes substantially conforming to the cross-sectional shapes and sizes of the energy directing ribs 56 formed on the bottom cover 14 of the first embodiment.

The pavement marker 70 is assembled by securing the front and rear lenses 74 and 76 in the front and rear lens recesses 112 and 118 by conventional affixation means, such as adhesive, welding or mechanical affixation. The top cover 78 then is telescoped into the top cover recess 124. As a result, the energy directing ribs 144 telescope loosely into the web grooves 134. Simultaneously, the peripheral energy directing rib 146 telescopes into the peripheral groove 136 continuously about the periphery of the top cover 78. The assembled pavement marker 70 then is presented to an ultrasonic welding apparatus. The apparatus includes a horn that substantially registers with the energy directing ribs 144 and 146. Mechanical pressure and sound energy then are applied to the top cover 78. As a result, the plastic material of the energy directing ribs 144 and 146 melts and fills the respective grooves 134 and 136. Accordingly, an integral or unitary bond is provided between the energy directing rib 144 and 146 and the portions of the base 72 adjacent the grooves 134 and 136. This welded area defines a hermetic seal continuously about the periphery of the top cover 78 to prevent moisture from filling the coring holes 126 in the base 72. Such moisture could affect the optical performance and edge glow of the fluorescent material from which the top cover 78 is formed. Molten plastic can affect the internal reflection of photons within the top cover 78. The nested arrangement of the energy directing ribs 144 and 146 with the grooves 132 and 134 reduces the spreading of molten material and chanelizes the molten material into a smaller transverse area. As a result, any adverse impact of the ultrasonic welding on the optical performance of the fluorescent material from which the top cover 78 is formed will be substantially reduced.

While the invention has been described with respect to certain preferred embodiments, it is apparent that various changes can be made without departing from the scope of the invention as defined by the appended claims. For example, the interengagement of grooves with energy directors can be applied to the lens recesses and lenses in either the first or second embodiment. Additionally, other patterns of grooves and energy directors and other configurations of grooves and energy directors can be provided.

What is claimed is:

1. A pavement marker having a base and at least one opening formed in the base, portions of the base substantially adjacent the opening being formed with at least one groove, said groove having two side surfaces substantially opposed to one another and a connecting surface extending between the side surfaces, a cover secured to the base for covering the opening, the cover including at least one energy director nested into the groove in the base, the energy director being melted sufficiently for at least partly filling said groove and welding said cover to said base, whereby the opposed side surfaces of the groove substantially contain the melted energy director in the groove.

2. The pavement marker of claim 1, wherein the base and the cover each are formed unitarily from a plastic.

3. The pavement marker of claim 2, wherein the base is injection molded from a plastic material, the at least one opening in the base comprising a plurality of coring holes formed in the base, webs being defined between said coring holes, said at least one groove comprising grooves formed on said webs.

4. The pavement marker of claim 1, wherein said groove is of substantially rectangular cross-section.

5. The pavement marker of claim 1, wherein the at least one groove comprises a peripheral groove that extends continuously about peripheral regions of said opening and wherein said at least one energy director is formed for nested engagement within all of said groove around said periphery of said opening, such that said energy director is hermetically sealed to said base continuously about said opening.

6. The pavement marker of claim 5, wherein said cover is a top cover formed from a material for generating an optical signal.

7. The pavement marker of claim 6, wherein the top cover is formed unitarily from a fluorescent material.

8. The pavement marker of claim 1, wherein the cover is a bottom cover applied to a bottom surface of the base and configured for secure adhesive attachment to a pavement surface.

9. The pavement marker of claim 1, wherein portions of the base and the cover adjacent to but outside of said groove are substantially free of the melted energy director.

10. The pavement marker of claim 1, wherein the melted energy director fills substantially all of said groove and welds integrally to said opposed side surfaces and said base surface of said groove without forming puddles exteriorly of the groove.

* * * * *